United States Patent
Masuda et al.

(10) Patent No.: US 9,895,986 B2
(45) Date of Patent: Feb. 20, 2018

(54) ELECTRIC VEHICLE EXTERNALLY CHARGEABLE BY TWO DIFFERENT METHODS

(71) Applicant: TOYOTA JIDOSHA KABUSHIKI KAISHA, Toyota-shi, Aichi-ken (JP)

(72) Inventors: Tomokazu Masuda, Kasugai (JP); Masayuki Horiba, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 15/102,690

(22) PCT Filed: Dec. 3, 2014

(86) PCT No.: PCT/JP2014/006034
§ 371 (c)(1),
(2) Date: Jun. 8, 2016

(87) PCT Pub. No.: WO2015/104749
PCT Pub. Date: Jul. 16, 2015

(65) Prior Publication Data
US 2016/0325635 A1  Nov. 10, 2016

(30) Foreign Application Priority Data
Jan. 9, 2014  (JP) .................. 2014-002349

(51) Int. Cl.
*H02J 7/00* (2006.01)
*B60L 11/18* (2006.01)

(52) U.S. Cl.
CPC ....... *B60L 11/1816* (2013.01); *B60L 11/1818* (2013.01); *B60L 11/1824* (2013.01);
(Continued)

(58) Field of Classification Search
CPC ............. B60L 11/1816; B60L 11/1818; B60L 11/1824; B60L 11/1838
(Continued)

(56) References Cited

U.S. PATENT DOCUMENTS

2010/0320964 A1* 12/2010 Lathrop ................. B60K 6/445
320/109
2013/0307325 A1* 11/2013 Arasu ................... B60L 11/123
307/9.1
(Continued)

FOREIGN PATENT DOCUMENTS

JP  2010-238576 A  10/2010
JP  2011-015548 A   1/2011
(Continued)

*Primary Examiner* — Nathaniel Pelton
(74) *Attorney, Agent, or Firm* — Oliff PLC

(57) ABSTRACT

This vehicle includes an inlet for performing external charging of a first method as well as a charging cord and a relay for performing external charging of a second method. During external charging of the first method, a battery charger is controlled such that electric current having a value smaller than or equal to a current value indicated by a pilot signal flows. During external charging of the second method, the relay is caused to conduct, and the battery charger is controlled such that electric current having a value smaller than or equal to a previously defined current value flows. Therefore, external charging of the first method and that of the second method can be selectively executed with a simple configuration.

8 Claims, 8 Drawing Sheets

(52) U.S. Cl.
CPC ....... B60L 11/1838 (2013.01); *B60L 2210/30* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
USPC ........................................................ 320/109
See application file for complete search history.

(56) References Cited

U.S. PATENT DOCUMENTS

2014/0167691 A1\* 6/2014 Kamaga .............. B60L 11/1838
320/109
2014/0339009 A1\* 11/2014 Suzuki ..................... B60K 1/00
180/232

FOREIGN PATENT DOCUMENTS

| JP | 2013-034326 A | 2/2013 |
| JP | 2013-046477 A | 3/2013 |
| WO | 2013/027291 A1 | 2/2013 |
| WO | WO2013027291 \* | 2/2013 |

\* cited by examiner

ELECTRIC VEHICLE EXTERNALLY CHARGEABLE BY TWO DIFFERENT METHODS

TECHNICAL FIELD

The present invention relates to a vehicle, and more particularly to a vehicle having a power storage device mounted thereon.

BACKGROUND ART

In recent years, vehicles such as electric vehicles driven by DC power stored in a power storage device are being developed. The method of externally charging the power storage device of such a vehicle is roughly divided into two methods. The first one is to connect a vehicle and charging equipment with a charging cable, transmit a control signal which specifies the upper limit of charging current from the charging equipment to the vehicle, and restrict the charging current to be smaller than or equal to the upper limit (see e.g., Japanese Patent Laying-Open No. 2013-34326 (PTL 1)).

The second method is to extend a charging cord from the vehicle and insert a plug provided at the leading end thereof into an outlet of charging equipment. In the second method, a control signal as in the first method is not used.

CITATION LIST

Patent Literature

[PTL 1] Japanese Patent Laying-Open No. 2013-34326

SUMMARY OF INVENTION

Technical Problem

In the second method, charging current may become excessive since there is no control signal which specifies the upper limit of the charging current. Thus, a breaker on the charging equipment side may be interrupted, causing power failure, for example.

However, there are many users who prefer employing the second method paying attention to the convenience of the second method. It is therefore desired to develop a vehicle which can be charged by the first method as well as by the second method. Such a vehicle, however, raises problems of complicated device configuration and increased cost.

Therefore, a main object of the present invention is to provide a vehicle having a simple configuration which can be externally charged by the method in which a control signal is used as well as by the method in which a control signal is not used.

Solution to Problem

A vehicle according to the present invention includes a power storage device configured to store DC power, a first power receiving unit including a first terminal configured to receive external power during external charging from the outside of the vehicle and a second terminal configured to receive a control signal indicative of a first current value, and a second power receiving unit configured to receive external power during external charging from the outside of the vehicle. The vehicle further includes a normally-off relay having one terminal connected to the second power receiving unit, a battery charger connected to the first terminal of the first power receiving unit and the other terminal of the relay to charge the power storage device, and a control device. During external charging through the first power receiving unit, the control device is configured to receive the control signal from the outside through the second terminal and control the battery charger such that an input current of the battery charger has a value smaller than or equal to the first current value indicated by the control signal. During external charging through the second power receiving unit, the control device is configured to bring the relay to conduct and control the battery charger such that the input current of the battery charger has a value smaller than or equal to a predetermined second current value. Therefore, the power storage device can be externally charged with a simple configuration, by the method of using a control signal as well as by the method without using a control signal.

Preferably, during external charging through the second power receiving unit, the control device causes the relay to conduct after detecting that a voltage has been applied to the one terminal of the relay and a voltage has not been applied to the other terminal of the relay. In this case, the relay can be prevented from conducting when a voltage is applied to the first terminal of the first power receiving unit.

Preferably, the vehicle further includes a first voltage detector and a second voltage detector configured to detect voltages at the one terminal and the other terminal of the relay, respectively. The control device detects whether or not a voltage has been applied to each of the one terminal and the other terminal of the relay, based on the detection results of the first and second voltage detectors. In this case, it can be determined accurately and easily as to whether a voltage has been applied to each of the one and the other terminals of the relay.

Preferably, the control signal includes an oscillation signal of a predetermined frequency. The control device performs an external charging operation through the first power receiving unit when the oscillation signal has been given to the second terminal of the first power receiving unit. The control device performs the external charging operation through the second power receiving unit when the oscillation signal has not been given to the second terminal of the first power receiving unit. In this case, it can be determined accurately and easily as to through which one of the first and second power receiving units the external charging operation is to be performed.

Preferably, the control device brings the relay into a non-conducting state with the second power receiving unit receiving external power after termination of external charging through the second power receiving unit, and determines that the relay has been stuck in a conducting state when voltages have been applied to both the one and the other terminals of the relay. In this case, it can be determined accurately and easily as to whether or not the relay has been stuck in the conducting state.

Preferably, the vehicle further includes a cover usually closed to cover the first power receiving unit. The cover is opened during external charging through the first power receiving unit, so that the first power receiving unit is exposed to the outside. The control device does not cause the relay to conduct when the cover is opened. In this case, the first terminal to which an AC voltage has been applied can be prevented from being exposed to the outside.

Preferably, the vehicle further includes a lock unit configured to usually bring the cover which is closed into a locked state where it cannot be opened/closed. The lock unit is configured to bring the cover into an unlocked state where it can be opened/closed during external charging through the first power receiving unit. The control device does not cause the relay to conduct when the cover is in the unlocked state. In this case, the first terminal to which an AC voltage has been applied can be prevented from being exposed to the outside.

Preferably, the vehicle further includes a charging cord having one end connected to the second power receiving unit and the other end receiving external power during external charging through the second power receiving unit. In this case, external charging can be easily performed through use of the charging cord.

Preferably, the vehicle further includes a cord reel configured to release the charging cord out of the vehicle when the charging cord is used and to rewind the charging cord into the vehicle when the charging cord is not used. In this case, the charging cord can be easily stored in a compact manner.

Preferably, the first power receiving unit is connected to an external charging device with a charging cable during external charging through the first power receiving unit. The first current value is a rated current value of the charging cable, and the second current value is a rated current value of the charging cord. In this case, the charging cable and the charging cord can be prevented from being damaged by overcurrent.

Advantageous Effects of Invention

As described above, according to the present invention, the power storage device can be externally charged with a simple configuration, by the first method in which a control signal is used as well as by the second method in which a control signal is not used.

DESCRIPTION OF EMBODIMENTS

Figure 1:
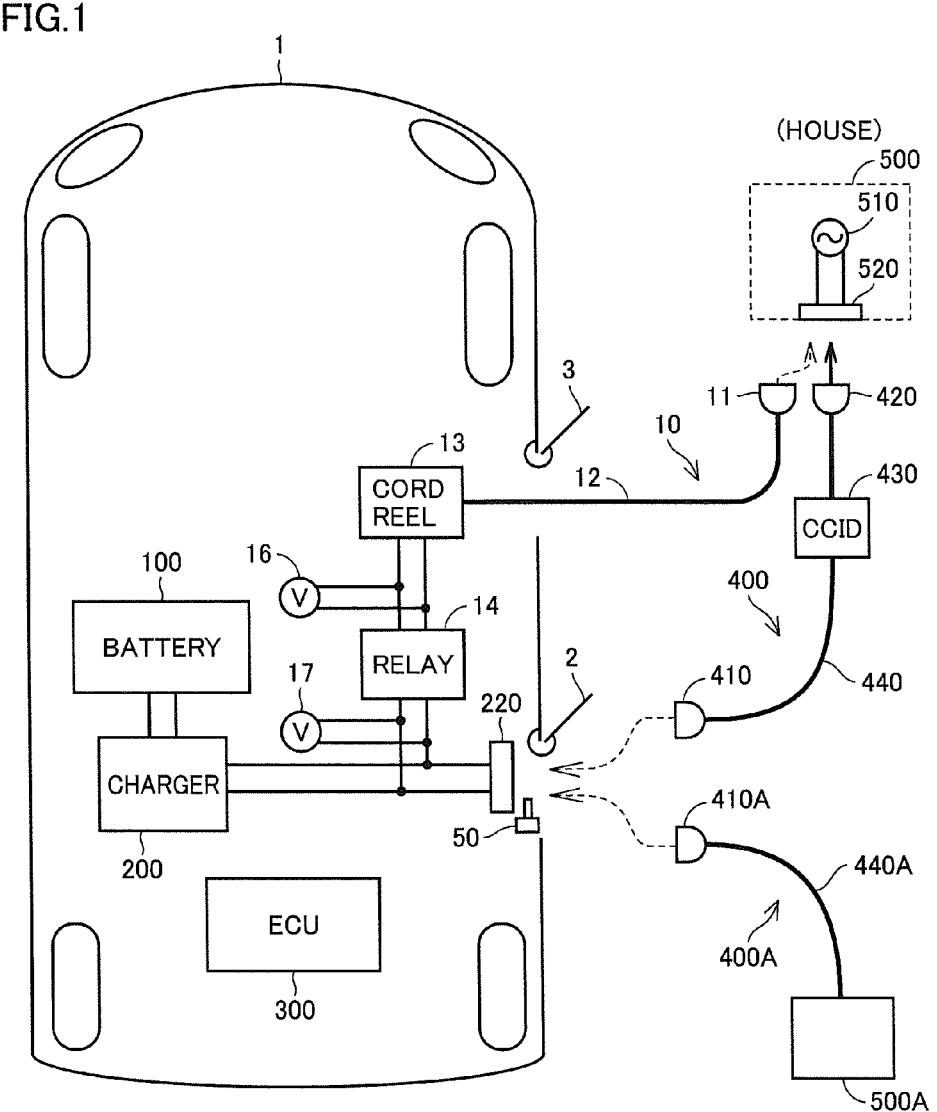
FIG. 1 is a block diagram showing an overall configuration of a charging system according to one embodiment of the present invention.

FIG. 1 is a block diagram showing an overall configuration of a charging system according to one embodiment of the present invention. In FIG. 1, this charging system is a system including a vehicle 1, household charging equipment 500 provided at a house, and public charging equipment 500A provided at a public charging station. The system charges a battery 100 mounted on vehicle 1 with electric power supplied from charging equipment 500 or 500A (hereinafter also referred to as "external power"). Hereinafter, charging of battery 100 with external power will also be referred to as "external charging." It is noted that external power may be DC power although the present embodiment will address the case where external power is AC power.

Vehicle 1 includes battery 100 storing DC power for driving a traction motor, a battery charger 200 converting external power into DC power for supply to battery 100, and an ECU (Electronic Control Unit) 300 exerting control of vehicle 1. ECU 300 is a computer including a CPU (Central Processing Unit), a memory, and the like therein. Vehicle 1 runs with the traction motor not shown but driven with electric power stored in battery 100. It is noted that the present invention is applicable generally to electric-powered vehicles (electric vehicles, fuel cell vehicles, hybrid vehicles, etc.) capable of obtaining driving force at least with electric power.

Vehicle 1 also includes an inlet 220 which is a first power receiving unit as a structure for performing external charging of the first method through use of a pilot signal CPLT. The external charging of the first method is external charging through the first power receiving unit. Inlet 220 is configured to be selectively connectable to one of a personal charging cable 400 and a shared charging cable 400A. For external charging at home, a charging connector 410 of personal charging cable 400 is connected to inlet 220. For external charging at a charging station, a charging connector 410A of shared charging cable 400A is connected to inlet 220.

Inlet 220 receives, from the outside, AC power and pilot signal CPLT which is a control signal specifying a rated current value (a first current value) of charging cable 400 or 400A. Generally, since personal charging cable 400 and shared charging cable 400A have different rated current values, the rated current value specified by pilot signal CPLT differs between the case of using personal charging cable 400 and the case of using shared charging cable 400A.

In the case of performing external charging of the first method, ECU 300 controls battery charger 200 such that electric current of a value smaller than or equal to the current value specified by pilot signal CPLT flows through charging cable 400 or 400A. In other words, ECU 300 controls battery charger 200 such that an input current of battery charger 200 has a value smaller than or equal to the current value specified by pilot signal CPLT.

Vehicle 1 is also provided with an inlet cover 2 and a lock unit 50. In the case of not using inlet 220, inlet cover 2 is closed so that inlet 220 is covered with inlet cover 2, and inlet cover 2 is brought into a locked state, by lock unit 50, that cannot be opened/closed. In the case of using inlet 220, inlet cover 2 is brought into an unlocked state that can be opened/closed by lock unit 50, and inlet cover 2 is opened so that inlet 220 is exposed to the outside.

Vehicle 1 also includes a charging cord 10, a relay 14, and voltage detectors 16 and 17 as a structure for performing external charging of the second method in which pilot signal CPLT is not used. The body of vehicle 1 has a hole formed therein through which charging cord 10 is to be inserted, and a cover 3 for closing the hole is provided. A cord reel 13 for rewinding charging cord 10 through the hole is also provided. Charging cord 10 includes a plug 11 and an AC power line 12 with plug 11 connected to its one end. AC power line 12 has its other end connected to battery charger 200 with cord reel 13 and relay 14 in vehicle 1 interposed therebetween.

Cord reel 13 releases charging cord 10 out of vehicle 1 in the case of using charging cord 10, and rewinds charging cord 10 and stores it in vehicle 1 in the case of not using charging cord 10. Relay 14 is a normally-off relay, usually remaining in a non-conducting state and being brought into a conducting state in the case of performing external charging of the second method.

Voltage detector 17 detects an AC voltage at the terminal of relay 14 on the charging cord 10 side, and supplies a signal indicative of the detected value to ECU 300. Voltage detector 16 detects an AC voltage at the terminal of relay 14 on the inlet 220 side, and supplies a signal indicative of the detected value to ECU 300.

In the case of performing external charging of the second method, ECU 300 causes relay 14 to conduct to control battery charger 200 when an AC voltage has been detected by voltage detector 16 and an AC voltage has not been detected by voltage detector 17.

In the second method, pilot signal CPLT is not used, but the rated current value (a second current value) of charging cord 10 has previously been stored by ECU 300. ECU 300 controls battery charger 200 such that electric current flowing through charging cord 10 (i.e., input current of battery charger 200) has a value smaller than or equal to the rated current value of charging cord 10. The rated current value of charging cord 10 is equal to that of a power supply cord of a typical home appliance, and is 6 A (amperes), for example.

Household charging equipment 500 is used for performing external charging of the first method and the second method, and is configured to include an AC power supply 510 and an outlet 520. Outlet 520 is an AC (alternating current) outlet for home use. It is noted that the present embodiment addresses the case where household charging equipment 500 is installed at a parking area of a house, however, the installation location of household charging equipment 500 is not limited to a house, but may be a place distant from the house, for example.

Personal charging cable 400 includes an AC power line 440, charging connector 410 provided at one end of AC power line 440, a plug 420 provided at the other end of AC power line 440, and a charging circuit interrupt device (hereinafter also referred to as "CCID") 430 provided on AC power line 440.

Charging connector 410 is configured to be attachable/detachable to/from inlet 220 of vehicle 1. Plug 420 is configured to be attachable/detachable to/from outlet 520 of household charging equipment 500. CCID 430 is a circuit for switching supply and interruption of electric power from household charging equipment 500 to vehicle 1, and transmitting pilot signal CPLT which specifies the rated current value of personal charging cable 400 to ECU 300 in vehicle 1.

In the case of performing external charging of the first method through use of household charging equipment 500, inlet cover 2 is opened and connector 410 is inserted into inlet 220 exposed to the outside, while plug 420 is inserted into outlet 520 of household charging equipment 500. CCID 430 transmits pilot signal CPLT to ECU 300 in vehicle 1. ECU 300 controls battery charger 200 such that electric current having a value smaller than or equal to the current value specified by pilot signal CPLT (rated current value of personal charging cable 400) flows through charging cable 400 (i.e., such that it flows into battery charger 200).

After charging is terminated, connector 410 is removed from inlet 220, inlet cover 2 is closed, and inlet cover 2 is brought into the locked state by lock unit 50. Plug 420 is withdrawn from outlet 520, and the charging operation is terminated.

In the case of performing external charging of the second method through use of household charging equipment 500, cover 3 is opened, the leading end of charging cord 10 is extended from vehicle 1 to household charging equipment 500, and plug 11 is inserted into outlet 520 of household charging equipment 500. Based on the detection results of voltage detectors 16 and 17, ECU 300 checks that an AC voltage has been applied to the terminal of relay 14 on the charging cord 10 side and that an AC voltage has not been applied to the terminal of relay 14 on the battery charger 200 side, and then causes relay 14 to conduct.

ECU 300 also controls battery charger 200 such that electric current having a value smaller than or equal to a previously stored current value (rated current value of charging cord 10) flows through charging cord 10 (i.e., such that it flows into battery charger 200). When charging is terminated, plug 11 is withdrawn from outlet 520, charging cord 10 is rewound by cord reel 13, cover 3 is closed, and the charging operation is terminated.

On the other hand, public charging equipment 500A at the charging station is used for performing external charging of the first method. In the case of performing external charging of the first method through use of public charging equipment 500A, public charging equipment 500A and vehicle 1 are connected with shared charging cable 400A. Shared charging cable 400A includes an AC power line 440A and charging connector 410A provided at one end of AC power line 440A. AC power line 440A has its other end directly connected to public charging equipment 500A (connected fixedly).

That is, inlet cover 2 is opened, and connector 410A is inserted into inlet 220 exposed to the outside. Public charging equipment 500A supplies AC power to battery charger 200 in vehicle 1, and transmits pilot signal CPLT which specifies the rated current value of shared charging cable 400A to ECU 300 in vehicle 1. ECU 300 controls battery charger 200 such that electric current having a value smaller than or equal to the current value specified by pilot signal CPLT (rated current value of shared charging cable 400A) flows through shared charging cable 400A (i.e., such that it flows into battery charger 200).

When charging is terminated, connector 410A is removed from inlet 220, inlet cover 2 is closed, and inlet cover 2 is brought into the locked state by lock unit 50.

It is noted that personal charging cable 400 and shared charging cable 400A may be described below collectively as a "charging cable" if distinction is not particularly necessary. Similarly, charging connector 410 and charging connector 410A may be described below collectively as a "charging connector" if distinction is not particularly necessary.

Figure 2:
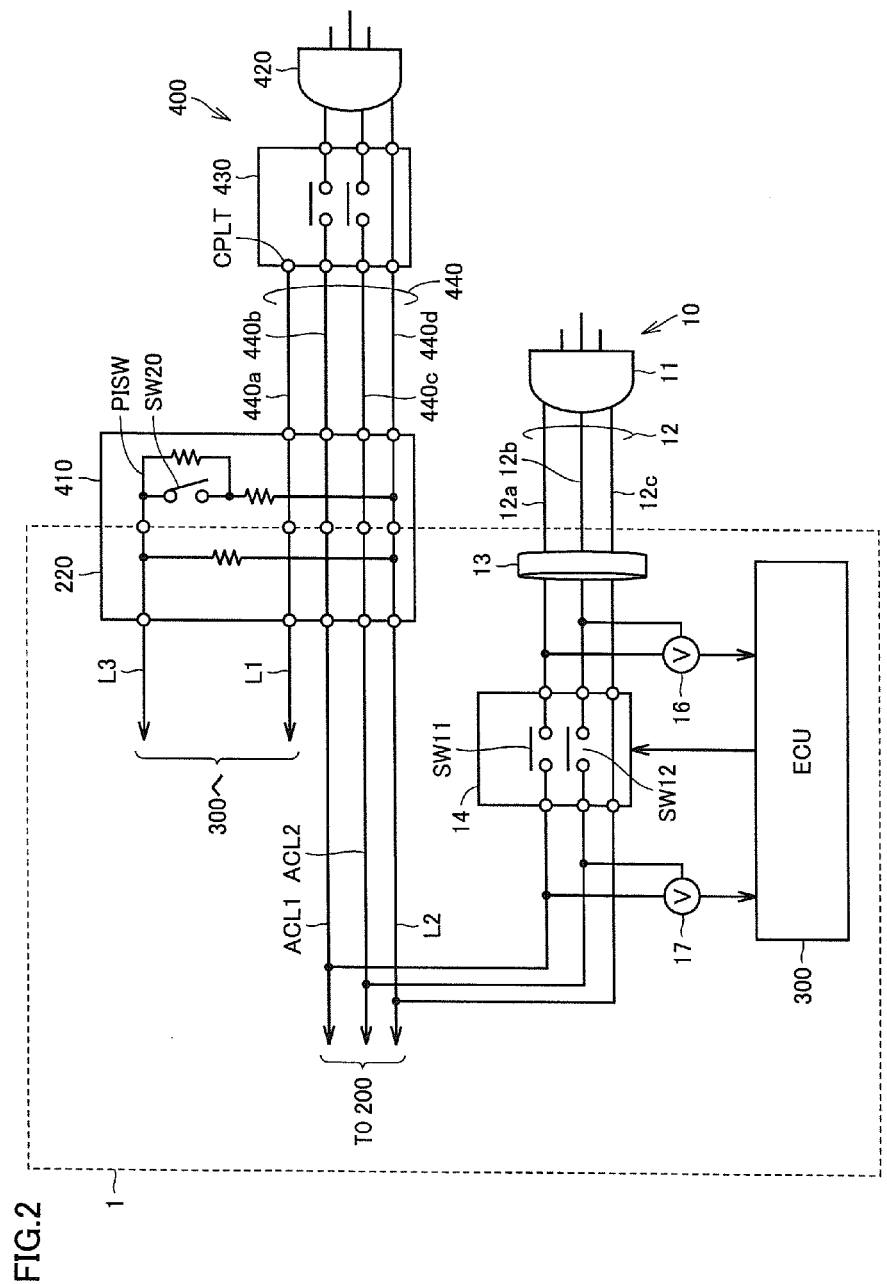
FIG. 2 is a circuit block diagram showing an essential part of the charging system shown in FIG. 1.

FIG. 2 is a circuit block diagram showing an essential part of the charging system shown in FIG. 1. In FIG. 2, plug 420 of personal charging cable 400 includes two power terminals for receiving AC power, and a grounding terminal for receiving a ground voltage. CCID 430 includes a CCID relay for switching between supply and interruption of AC power.

AC power line 440 includes a control pilot line 440a through which pilot signal CPLT is transmitted, electric power lines 440b and 440c through which AC power is supplied, and a ground line 440d through which the ground voltage is supplied. Control pilot line 440a receives at its one end pilot signal CPLT from CCID 430. Electric power lines 440b and 440c have their one ends connected to the two power terminals of plug 420 with the CCID relay interposed therebetween, respectively, and ground line 440d has its one end connected to the grounding terminal of plug 420.

Connector 410 includes a switch SW20 and a plurality of resistance elements for generating a connection signal PISW indicative of the connection state between inlet 22 and connector 410, a first terminal where connection signal PISW is transmitted/received, a second terminal where pilot signal CPLT is transmitted/received, third and fourth terminals where AC power is transmitted/received, as well as a fifth terminal where the ground voltage is transmitted/received. The second to fifth terminals are connected to the other ends of control pilot line 440a, electric power lines 440b, 440c, and ground line 440d, respectively.

Inlet 220 of vehicle 1 includes a first terminal where connection signal PISW is transmitted/received, a second terminal where pilot signal CPLT is transmitted/received, third and fourth terminals where AC power is transmitted/received, as well as a fifth terminal where the ground voltage is transmitted/received. When connector 410 is inserted into inlet 220, the first to fifth terminals of connector 410 and the first to fifth terminals of inlet 220 are electrically connected, respectively.

In vehicle 1, a control pilot line L1, a ground line L2, a connection signal line L3, and AC power lines ACL1 and ACL2 are provided. Control pilot line L1 is connected across the second terminal of inlet 220 and ECU 300 for transmission of pilot signal CPLT. Ground line L2 is connected across the fifth terminal of inlet 220 and battery charger 200 for transmission of the ground voltage. Connection signal line L3 is connected across the first terminal of inlet 220 and ECU 300 for transmission of connection signal PISW. AC power lines ACL1 and ACL2 are connected across the third and fourth terminals of inlet 220 and battery charger 200 for transmission of AC power.

Plug 11 of charging cord 10 includes two power terminals where AC power is received, as well as a grounding terminal where the ground voltage is received. AC power line 12 includes electric power lines 12a and 12b through which AC power is supplied, as well as a ground line 12c through which the ground voltage is supplied. Relay 14 includes two switches SW11 and SW12. Each of switches SW11 and SW12 is a normally-off type, and are usually in the non-conducting state.

Electric power line 12a is connected across one of the power terminals of plug 11 and the one terminal of switch SW11, and the other terminal of switch SW11 is connected to electric power line ACL1. Electric power line 12b is connected across the other one of the power terminals of plug 11 and the one terminal of switch SW12, and the other terminal of switch SW12 is connected to electric power line ACL2. Ground line 12c is connected across the ground terminal of plug 11 and ground line L2. Cord reel 13 includes a drum for rewinding charging cord 10.

Three terminals of relay 14 connected to electric power lines 12a, 12b and ground line 12c of charging cord 10 constitute a second power receiving unit. External charging of the second method is external charging through the second power receiving unit. Charging cord 10 and cord reel 13 may be provided as options, and may be attached to the vehicle only when the vehicle's owner wishes.

Voltage detector 16 detects an AC voltage across the one terminals of switches SW11 and SW12 (the terminals on the plug 11 side), and outputs a signal indicative of the detected value to ECU 300. Voltage detector 17 detects an AC voltage across the other terminals of switches SW11 and SW12 (terminals on the inlet 220 side), and outputs a signal indicative of the detected value to ECU 300.

In the case of charging battery 100 through use of plug 11, ECU 300 checks that an AC voltage has been applied to the one terminals of switches SW11 and SW12 and that an AC voltage has not been applied to the other terminals of switches SW11 and SW12 based on the detection results of voltage detectors 16 and 17, and then causes switches SW11 and SW12 to conduct. ECU 300 also controls battery charger 200 such that electric current flowing through charging cord 10 has a value smaller than or equal to the rated current value of charging cord 10 stored previously.

Figure 3:
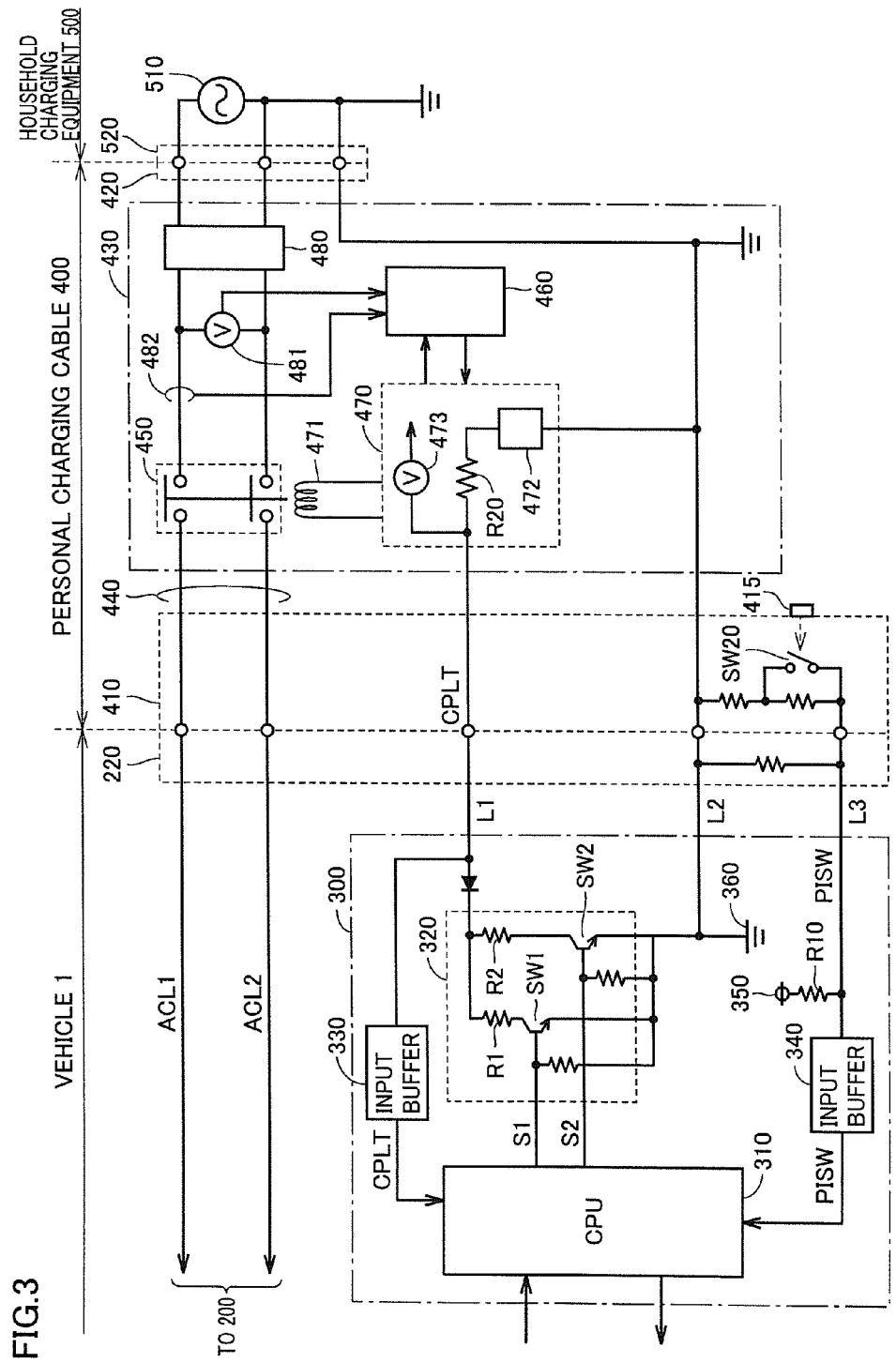
FIG. 3 is a circuit block diagram showing a part of the charging system shown in FIG. 1 relevant to external charging through use of a personal charging cable.

FIG. 3 is a circuit block diagram showing a part of the charging system relevant to external charging of the first method through use of personal charging cable 400. In FIG. 3, in the case where personal charging cable 400 is connected to inlet 220, ECU 300 receives connection signal PISW from charging connector 410 of personal charging cable 400. Connection signal PISW is a signal indicative of the connection state between inlet 220 and connector 410.

In the case where personal charging cable 400 is connected to household charging equipment 500 and inlet 220, ECU 300 receives pilot signal CPLT from CCID 430 of personal charging cable 400 through control pilot line L1. Pilot signal CPLT in this case is used for informing ECU 300 from a control pilot circuit 470 of the rated current value of personal charging cable 400. Pilot signal CPLT is also used as a signal for remotely operating a CCID relay 450 by ECU 300 based on the electric potential of pilot signal CPLT operated by ECU 300.

CCID 430 in personal charging cable 400 includes CCID relay 450, a CCID control unit 460, control pilot circuit 470, an electromagnetic coil 471, an electric leakage detector 480, a voltage detector 481, and a current detector 482. Control pilot circuit 470 includes an oscillator 472, a resistance element R20, and a voltage detector 473.

CCID relay 450 is inserted into AC power line 440 in personal charging cable 400. CCID relay 450 is controlled by control pilot circuit 470. When changing CCID relay 450 is in the non-conducting state, an electric circuit is interrupted within personal charging cable 400. On the other hand, when CCID relay 450 is brought into the conducting state, electric power is supplied from household charging equipment 500 to vehicle 1.

Control pilot circuit 470 outputs pilot signal CPLT to ECU 300 through charging connector 410 and inlet 220. Then, control pilot circuit 470 controls CCID relay 450 based on the potential change of pilot signal CPLT.

For above-described pilot signal CPLT, connection signal PISW, the shape of inlet 220 and the arrangement of its terminals, the shape of charging connector 410 and the arrangement of its terminals, features standardized by SAE (Society of Automotive Engineers) in the United States, Japan Electric Vehicle Association or the like, for example, may be used.

Although CCID control unit 460 includes a CPU, a memory device and an input/output buffer, neither of which is shown, and transmits/receives a signal to/from each of detectors 481, 482 and control pilot circuit 470, and controls the charging operation of personal charging cable 400.

Oscillator 472 outputs non-oscillating pilot signal CPLT when the electric potential of pilot signal CPLT detected by voltage detector 473 is a prescribed electric potential V1 (e.g., 12V).

When the electric potential of pilot signal CPLT drops to an electric potential V2 (e.g., 9V) which is lower than above-described prescribed electric potential V1, oscillator 472 is controlled by CCID control unit 460 to output pilot signal CPLT oscillating at a prescribed frequency (e.g., 1 kHz) and a prescribed duty ratio. At this time, the electric potential of pilot signal CPLT varies between V2 and −V1. In other words, pilot signal CPLT includes an oscillation signal of a prescribed frequency and a prescribed duty ratio.

It is noted that the duty ratio of pilot signal CPLT is set based on the rated current that can be supplied from household charging equipment 500 to vehicle 1 through personal charging cable 400.

ECU 300 can detect the rated current that can be supplied to vehicle 1 through personal charging cable 400, based on the duty ratio of pilot signal CPLT received through control pilot line L1.

When the positive electric potential of pilot signal CPLT is decreased by ECU 300 to an electric potential V3 (e.g., 6V) which is still lower than electric potential V2, control pilot circuit 470 supplies electric current to electromagnetic coil 471. At this time, the electric potential of pilot signal CPLT varies between V3 and −V1. Also at this time, pilot signal CPLT includes an oscillation signal of a prescribed frequency and a duty ratio. Electromagnetic coil 471 generates electromagnetic force upon receipt of electric current from control pilot circuit 470, and closes the contact point of CCID relay 450 to bring it into the conducting state.

It is noted that the electric potential of pilot signal CPLT is operated by ECU 300. The details will be described later.

Electric leakage detector 480 is provided in CCID 430 on the way of AC power line 440 of personal charging cable 400, and detects the presence/absence of electric leakage.

When plug 420 of personal charging cable 400 is inserted into outlet 520, voltage detector 481 detects the supply voltage transmitted from household charging equipment 500, and informs CCID control unit 460 of the detected value. Current detector 482 detects the charging current flowing through AC power line 440, and informs CCID control unit 460 of the detected value.

Switch SW20 is provided in charging connector 410. Switch SW20 is a limit switch, for example, whose contact point is closed with charging connector 410 reliably fitted within inlet 220. In the state where charging connector 410 is disconnected to inlet 220, and in the case of the fitting state of charging connector 410 and inlet 220 is unreliable, the contact point of switch SW20 is opened. The contact point of switch SW20 is also opened by operating a push button 415 provided for charging connector 410 and operated by a user when disconnecting charging connector 410 from inlet 220.

Where charging connector 410 is disconnected from inlet 220, a voltage signal determined by the voltage of a power supply node 350 and a pull-up resistance element R10 included in ECU 300 as well as a plurality of resistance elements provided for inlet 220 is generated on connection signal line L3 as connection signal PISW. Where charging connector 410 is connected to inlet 220, a voltage signal in accordance with a combined resistance obtained by combining the plurality of resistance elements provided for inlet 220 and charging connector 410 is generated on connection signal line L3 in correspondence with the fitting state, the operation state of push button 415 and the like.

ECU 300 is capable of determining the connection state of charging connector 410 by detecting the electric potential of connection signal line L3 (i.e., the electric potential of connection signal PISW).

In vehicle 1, ECU 300 further includes a CPU 310, a resistance circuit 320, as well as input buffers 330 and 340, in addition to power supply node 350 and pull-up resistance element R10 described above.

Resistance circuit 320 is a circuit for operating the electric potential of pilot signal CPLT from the vehicle 1 side. Resistance circuit 320 includes pull-down resistance elements R1 and R2 as well as switches SW1 and SW2. Pull-down resistance element R1 and switch SW1 are connected in series across control pilot line L1 by which pilot signal CPLT is transmitted and a vehicle ground 360. Pull-down resistance element R2 and switch SW2 are also connected in series across control pilot line L1 and vehicle ground 360. Switches SW1 and SW2 are controlled to take a conducting (ON) state or the non-conducting (OFF) state in accordance with control signals S1 and S2 from CPU 310, respectively.

Input buffer 330 receives pilot signal CPLT on control pilot line L1, and outputs received pilot signal CPLT to CPU 310. Input buffer 340 receives connection signal PISW from connection signal line L3 connected to switch SW20 of charging connector 410, and outputs received connection signal PISW to CPU 310. It is noted that, as described above, a voltage is applied from ECU 300 to connection signal line L3, and the electric potential of connection signal PISW varies with the connection between inlet 220 of charging connector 410. CPU 310 detects the connection state of charging connector 410 by detecting the electric potential of this connection signal PISW.

CPU 310 receives pilot signal CPLT and connection signal PISW from input buffers 330 and 340, respectively. CPU 310 detects the electric potential of connection signal PISW, and detects the connection state and fitting state of charging connector 410. CPU 310 also detects the rated current value of personal charging cable 400 by detecting the oscillation state and duty ratio of pilot signal CPLT.

CPU 310 controls switches SW1 and SW2 in resistance circuit 320 based on the electric potential of connection signal PISW and the oscillation state of pilot signal CPLT, thereby operating the electric potential of pilot signal CPLT. By operating the electric potential of pilot signal CPLT, CPU 310 can remotely operate CCID relay 450 in personal charging cable 400 (see FIG. 5 to be described later).

When the contact point of CCID relay 450 in personal charging cable 400 is closed by the remote operation performed by CPU 310, AC power from household charging equipment 500 is supplied to battery charger 200, and preparation for external charging is completed. By outputting a control signal to battery charger 200, CPU 310 converts AC power from household charging equipment 500 into DC power with which battery 100 can be charged, and outputs the DC power to battery 100. Accordingly, external charging of battery 100 is executed.

Figure 4:
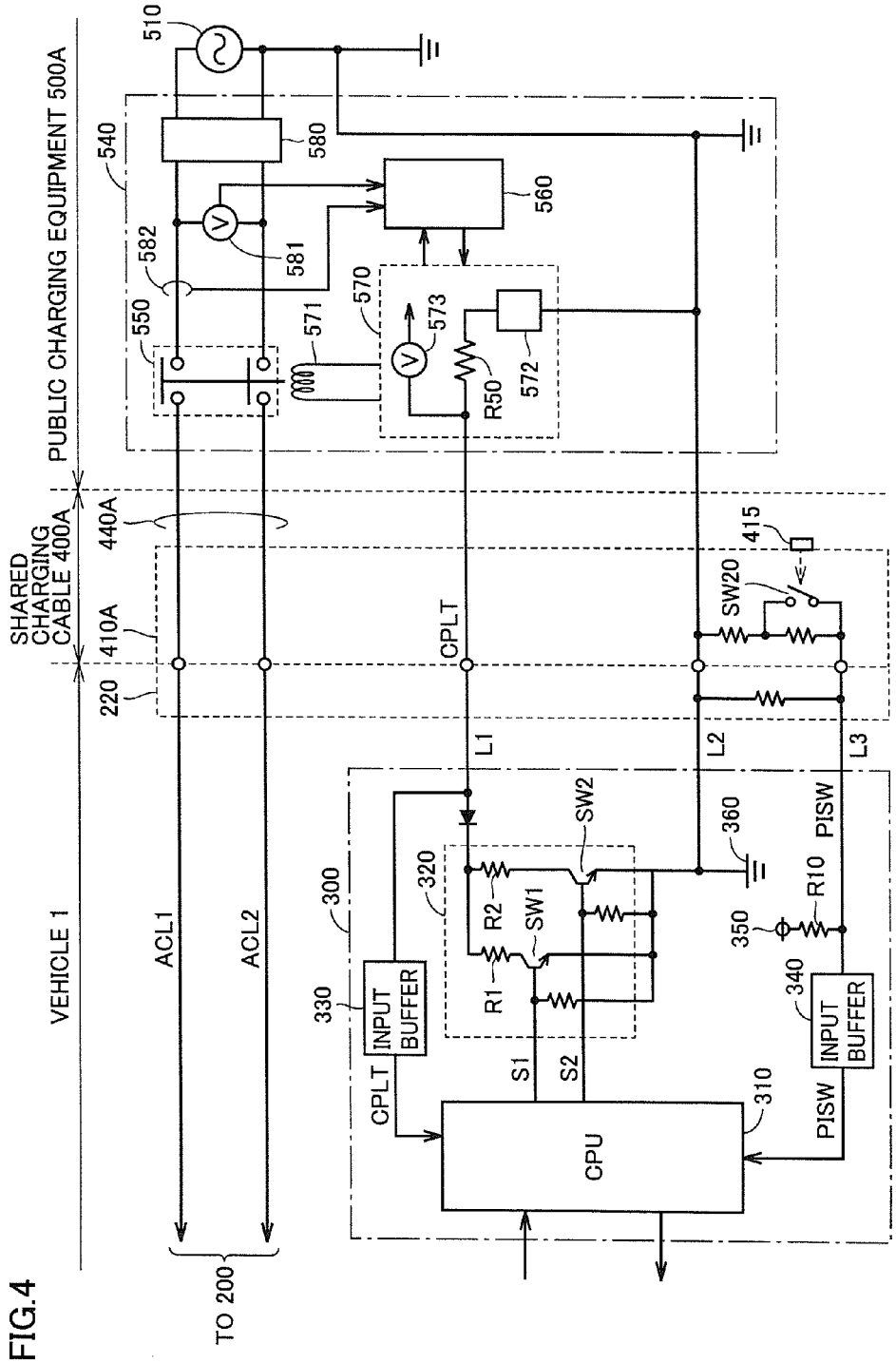
FIG. 4 is a circuit block diagram showing a part of the charging system shown in FIG. 1 relevant to external charging through use of a shared charging cable.

FIG. 4 is a circuit block diagram showing the configuration of the charging system when shared charging cable 400A is used, for comparison with FIG. 3. Referring to FIG. 4, the configuration in the case of using shared charging cable 400A is different from the case of using personal charging cable 400 mainly in that the CCID is provided in charging equipment, rather than on the charging cable.

It is noted that since the configuration of charging connector 410A of shared charging cable 400A is the same as that of charging connector 410 of personal charging cable 400 shown in FIG. 3, the detailed description thereof is not repeated here.

CCID 430 as included in personal charging cable 400 is not included in shared charging cable 400A. Instead, a CCID 540 is included in public charging equipment 500A. That is, in the case of performing external charging through use of shared charging cable 400A, pilot signal CPLT generated by CCID 540 of public charging equipment 500A is input to control pilot line L1 through shared charging cable 400A. Then, the electric potential of pilot signal CPLT is operated by ECU 300 controlling switches SW1 and SW2 in resistance circuit 320.

It is noted that the configuration of CCID 540 is basically the same as that of CCID 430 in FIG. 3. That is, a CCID relay 550, a CCID control unit 560, a control pilot circuit 570 (an oscillator 572, a resistance element R50, and a voltage detector 573), an electromagnetic coil 571, an electric leakage detector 580, a voltage detector 581, and a current detector 582 included in CCID 540 are configured identically with CCID relay 450, CCID control unit 460, control pilot circuit 470 (oscillator 472, resistance element R20, and voltage detector 473), electromagnetic coil 471, electric leakage detector 480, voltage detector 481, and current detector 482 included in CCID 430, respectively. Therefore, detailed description thereof is not repeated here.

It is noted that since the circuit configuration of vehicle 1 shown in FIG. 4 is the same as that shown in above-described FIG. 3, the detailed description thereof is not repeated here.

Figure 5:
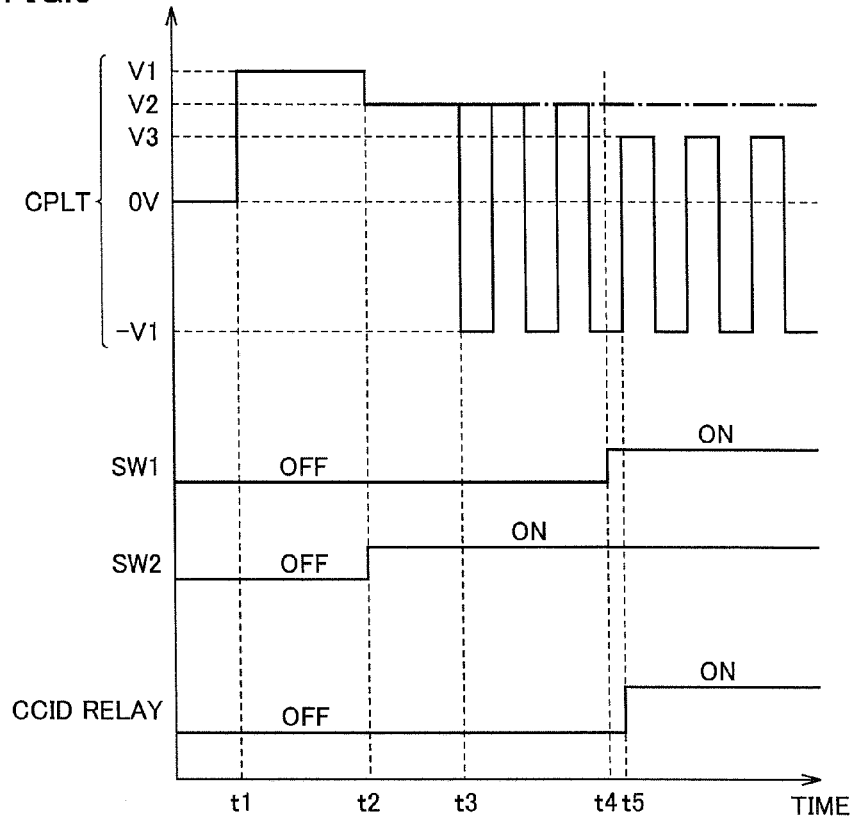
FIG. 5 is a time chart showing the state change of switches SW1 and SW2 shown in FIG. 3, the potential change of a pilot signal, and the state change of a CCID relay.

FIG. 5 is a time chart showing the state change of switches SW1 and SW2, the potential change of pilot signal CPLT, and the state change of CCID relay 450. It is noted that although FIG. 5 illustrates the case where personal charging cable 400 is used, basically the same applies to the case of using shared charging cable 400A.

Until time t1 arrives, personal charging cable 400 is not connected to either vehicle 1 or household charging equipment 500. In this state, respective switches SW1 and SW2 as well as CCID relay 450 are in the off state, and the electric potential of pilot signal CPLT is 0V.

At time t1, when plug 420 of personal charging cable 400 is connected to outlet 520 of household charging equipment 500, control pilot circuit 470 generates pilot signal CPLT upon receipt of the electric power from household charging equipment 500. It is noted that at this time t1, charging connector 410 of personal charging cable 400 is not connected to inlet 220. The electric potential of pilot signal CPLT is V1 (e.g., 12V), and pilot signal CPLT is in the non-oscillating state.

Then, when charging connector 410 is connected to inlet 220, connection signal PISW is input to CPU 310. In response to the input of this connection signal PISW, CPU 310 turns on switch SW2. Accordingly, the electric potential of pilot signal CPLT is decreased to V2 (e.g., 9V) by pull-down resistance element R2 (at time t2 in FIG. 5).

When it is detected by CCID control unit 460 that the electric potential of pilot signal CPLT has been decreased to V2, CCID control unit 460 outputs an oscillation command to oscillator 472 to oscillate pilot signal CPLT (at time t3 in FIG. 5).

When it is detected by CPU 310 that pilot signal CPLT has been oscillated, CPU 310 detects the rated current value of personal charging cable 400 by the duty ratio of pilot signal CPLT. Then, CPU 310 turns on switch SW1 in addition to switch SW2 (at time t4 in FIG. 5). Accordingly, the electric potential of pilot signal CPLT is decreased further to V3 (e.g., 6V) by pull-down resistance element R1 (at time t5 in FIG. 5).

When the electric potential of pilot signal CPLT has been decreased to V3, the contact point of CCID relay 450 is closed by control pilot circuit 470. Accordingly, electric power from household charging equipment 500 is transferred to vehicle 1 through personal charging cable 400. Then, in vehicle 1, external charging of battery 100 is started by CPU 310 controlling battery charger 200 (see FIG. 1).

Figure 6:
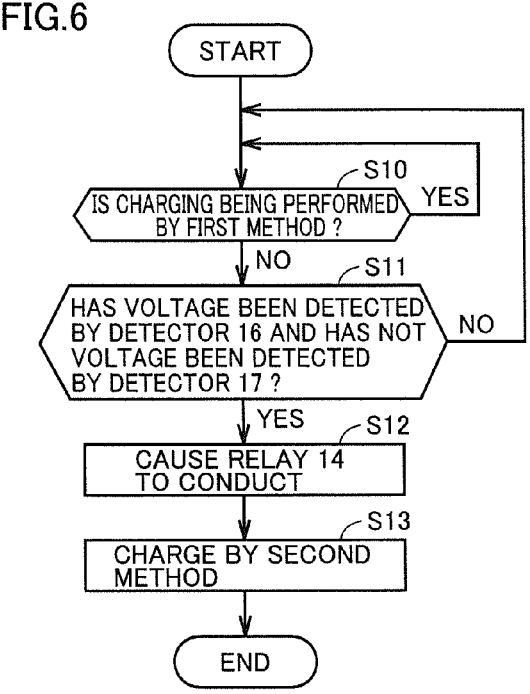
FIG. 6 is a flow chart showing the operation of ECU shown in FIG. 1.

FIG. 6 is a flow chart showing the operation of ECU 300 of determining whether to perform external charging of the second method. In step S10 of FIG. 6, ECU 300 determines whether or not charging is being performed by the first method. Specifically, ECU 300 determines whether or not battery charger 200 is controlled through use of pilot signal CPLT.

When it is determined in step S10 that charging is being performed by the first method, termination of external charging of the first method is waited. This is because external charging by the first method is to be performed preferentially since the charging current by the first method is generally larger than the charging current by the second method.

When it is determined in step S10 that charging is not being performed by the first method, it is determined in step S11 whether an AC voltage is detected by voltage detector 16 and an AC voltage is not detected by voltage detector 17. When the determination result of step S11 is negative, the process is returned to step S10.

When the determination result of step S11 is affirmative, that is, when an AC voltage is detected by voltage detector 16 and an AC voltage is not detected by voltage detector 17, relay 14 is caused to conduct in step S12, and external charging of the second method is performed in step S13.

Figure 7:
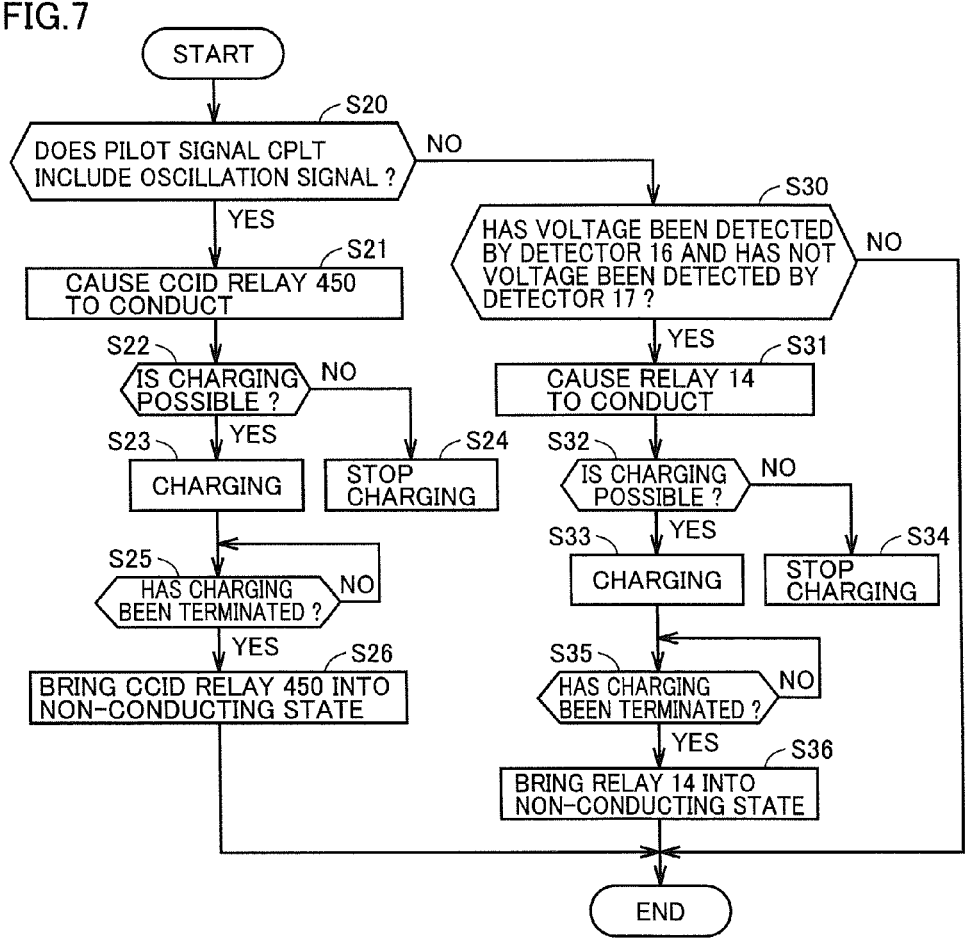
FIG. 7 is another flow chart showing the operation of ECU shown in FIG. 1.

FIG. 7 is a flow chart showing the operation of ECU 300 of selectively performing external charging of either the first method or the second method. In step S20 of FIG. 7, ECU 300 determines whether or not pilot signal CPLT includes an oscillation signal. When it is determined in step S20 that pilot signal CPLT includes an oscillation signal, then in step S21, pilot signal CPLT is controlled at 6V, so that CCID relay 450 conducts.

It is determined in step S22 whether or not external charging of the first method is possible, and when it is possible, external charging of the first method is performed in step S23. When it is not possible, external charging of the first method is stopped in step S24. When external charging of the first method is performed in step S23, termination of charging of battery 100 is waited in step S25. When charging is terminated, then in step S26, pilot signal CPLT is controlled at 9V to bring CCID relay 450 into the non-conducting state, thereby completing the external charging operation.

When it is determined in step S20 that pilot signal CPLT does not include an oscillation signal, it is determined in step S30 whether an AC voltage is detected by voltage detector 16 and an AC voltage is not detected by voltage detector 17. When the determination result of step S30 is negative, the charging operation is terminated.

When the determination result of step S30 is affirmative, that is, when an AC voltage is detected by voltage detector 16 and an AC voltage is not detected by voltage detector 17, relay 14 is caused to conduct in step S31.

It is determined in step S32 whether or not external charging of the second method is possible. When it is possible, external charging of the second method is performed in step S33, and when it is not possible, external charging of the second method is stopped in step S34. When external charging of the second method is performed in step S33, termination of charging of battery 100 is waited in step S35. When charging is terminated, then in step S36, relay 14 is brought into the non-conducting state, thereby completing the charging operation.

In this embodiment in which the configuration for performing external charging of the first method (inlet 220 etc.) and the configuration for performing external charging of the second method (charging cord 10, relay 14 and voltage detectors 16, 17) are provided, external charging of either the first method or the second method can be performed selectively.

Since normally-off relay 14 is provided across charging cord 10 and battery charger 200 and is caused to conduct when performing external charging of the second method, external charging of the first method or the second method can be performed with a simple configuration.

Since the rated current value of charging cord 10 is previously stored in ECU 300, and battery charger 200 is controlled such that electric current having a value smaller than or equal to the rated current value flows through charging cord 10 at the time of external charging of the second method, overcurrent is prevented from flowing through and damaging charging cord 10.

Since cord reel 13 for rewinding charging cord 10 is provided, charging cord 10 can be stored in vehicle 1 easily and in a compact manner when charging cord 10 is not used.

Since priority is given to external charging of the first method over external charging of the second method and relay 14 is not caused to conduct during execution of external charging of the first method, an AC voltage will not be applied to the terminals of plug 11 during execution of external charging of the first method, which ensures safety.

Hereinafter, various modifications of the present embodiment will be described. When overcurrent flows into relay 14 during external charging of the second method, electric repulsion (electromagnetic repulsion) will occur, and switches SW11 and SW12 will be going to open. Arc discharge occurs on that occasion, and switches SW11 and SW12 are each welded and fixed to the conducting state. That is, relay 14 is stuck in the on state to be fixed to the conducting state.

When relay 14 is fixed to the conducting state, the AC voltage applied to inlet 220 during external charging of the first method will flow back through relay 14 and charging cord 10, and the AC voltage will be applied to the power terminal of plug 11, and the power terminal to which the AC voltage has been applied will be exposed to the outside. Therefore, in this modification, whether relay 14 has been stuck in the on state is detected, and a report is made to a user if relay 14 has been stuck in the on state.

Figure 8:
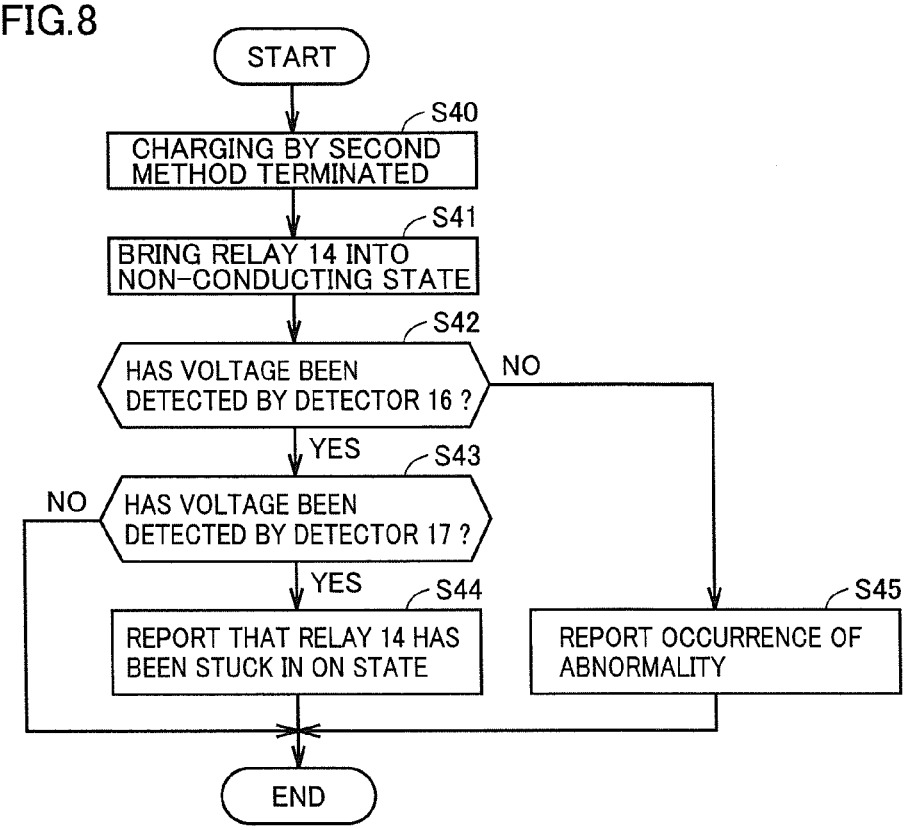
FIG. 8 is a flow chart showing a modification of the present embodiment.

FIG. 8 is a flow chart showing the operation of ECU 300 of determining whether or not relay 14 has been stuck in the on state. When external charging of the second method is terminated in step S40 of FIG. 8, then in step S41, ECU 300 brings relay 14 into the non-conducting state. It is determined in step S42 whether or not an AC voltage has been detected by voltage detector 16.

When an AC voltage has been detected in step S42, it is determined in step S43 whether or not an AC voltage has been detected by voltage detector 17. When an AC voltage has not been detected in step S43, the determining operation is terminated because relay 14 has not been stuck in the on state but is in the normal state.

When an AC voltage has been detected in step S43, relay 14 has been stuck in the on state. Then, in step S44, that relay 14 has been stuck in the on state is displayed on a display, for example, for report to the user, and the determining operation is terminated. Relay 14 stuck in the on state is replaced with a new relay. When an AC voltage has not been detected in step S42, some abnormality has occurred. Then, the fact is displayed on the display, for example, for report to the user, and the determining operation is terminated.

In this modification, whether relay 14 has been stuck in the on state is determined, and if relay 14 has been stuck in the on state, it is reported to the user. Therefore, external charging of the first method can be prevented from being performed with relay 14 stuck in the on state to expose to the outside the terminal of plug 11 to which the AC voltage has been applied.

Figure 9:
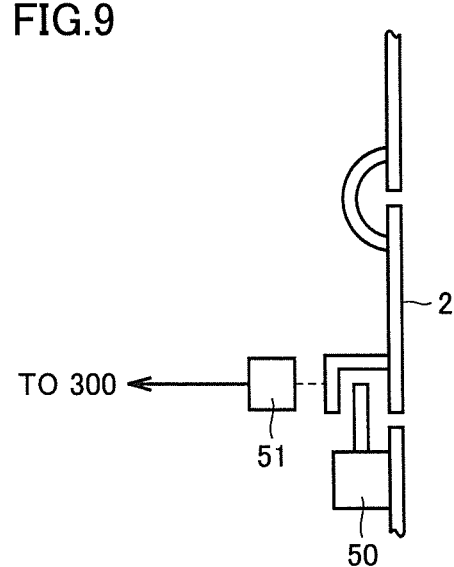
FIG. 9 shows another modification of the present embodiment.

FIG. 9 shows another modification of the present embodiment. In FIG. 9, in this modification, it is determined whether or not inlet cover 2 is closed, and an opening/closing detector 51 outputting a signal indicative of the result of determination to a ECU 300 is added to vehicle 1. FIG. 9 shows the state in which inlet cover 2 is closed, and a pin is extended from lock unit 50 to bring inlet cover 2 into the locked state where it cannot be opened/closed. When the pin of lock unit 50 is contracted, inlet cover 2 is brought into the unlocked state where it can be opened/closed.

ECU 300 causes relay 14 to conduct only when opening/closing detector 51 has detected that inlet cover 2 is closed, and when opening/closing detector 51 has detected that inlet cover 2 is opened, relay 14 is brought into the non-conducting state.

For example, a step S30A is provided between steps S20 and S30 in FIG. 7. It is determined in step S30A whether or not inlet cover 2 is closed. When inlet cover 2 is closed, the process is advanced to step S30. When inlet cover 2 is not closed, the external charging operation is terminated without performing steps S30 to S36.

Therefore, in this modification in which external charging of the second method is not performed when inlet cover 2 is opened, inlet 220 to which an AC voltage has been applied will not be exposed to the outside.

Figure 10:
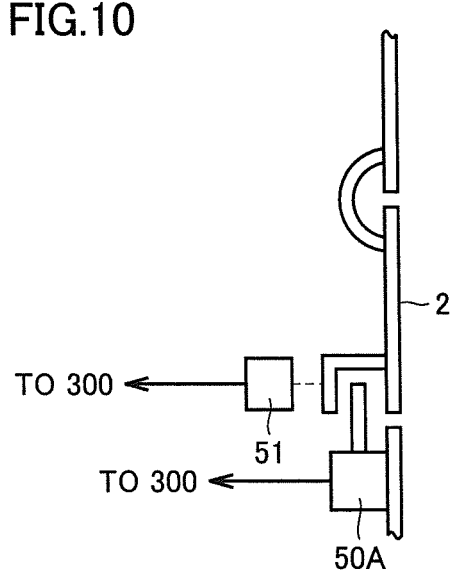
FIG. 10 shows still another modification of the present embodiment.

FIG. 10 shows still another modification of the present embodiment. In FIG. 10, lock unit 50 is replaced with a lock unit 50A in this modification. Lock unit 50A transmits a signal indicative of whether or not a pin has been extended to ECU 300. Only when opening/closing detector 51 has detected that inlet cover 2 is closed, and when the signal indicating that the pin has been extended from lock unit 50A is output (i.e., when inlet cover 2 has been brought into the locked state), ECU 300 causes relay 14 to conduct, and otherwise brings relay 14 into the non-conducting state.

For example, a step S30B is provided between steps S20 and S30 in FIG. 7. It is determined in step S30B whether or not inlet cover 2 has been brought into the locked state. When inlet cover 2 has been brought into the locked state, the process is advanced to step S30. When inlet cover 2 has not been brought into the locked state, the external charging operation is terminated without performing steps S30 to S36.

Therefore, in this modification in which relay 14 is brought into the non-conducting state when inlet cover 2 is in the unlocked state, inlet 220 to which an AC voltage has been applied will not be exposed to the outside.

It should be understood that the embodiment disclosed herein is illustrative and non-restrictive in every respect. The scope of the present invention is defined by the claims not by the description above, and is intended to include any modification within the meaning and scope equivalent to the terms of the claims.

REFERENCE SIGNS LIST 1 vehicle; 2 inlet cover; 3 cover; 10 charging cord; 11, 420 plug; 12, 440, 440A AC power line; 13 cord reel; 14 relay;

482, 582 current detector; 16, 17, 473, 481, 573, 581 voltage detector; 50, 50A lock unit; 51 opening/closing detector; 100 battery; 200 battery charger; 220 inlet; 300 ECU; 320 resistance circuit; 330, 340 input buffer; 350 power supply node; 360 vehicle ground; 400 personal charging cable; 400A shared charging cable; 410, 410A charging connector; 450, 550 CCID relay; 460, 560 CCID control unit; 470, 570 control pilot circuit; 471, 571 electromagnetic coil; 472, 572 oscillator; 480, 580 electric leakage detector; 500 house charging equipment 500A public charging equipment; 510 AC power supply; 520 outlet; ACL1, ACL2 electric power line; L1 control pilot line; L2 ground line; L3 connection signal line; R1, R2 pull-down resistance element; R10 pull-up resistance element; R20, R50 resistance element.

The invention claimed is:

1. A vehicle comprising:
 a power storage device configured to store DC power;
 a first power receiving unit including a first terminal configured to receive external power during external charging from the outside of the vehicle, and a second terminal configured to receive a control signal indicative of a first current value;
 a second power receiving unit configured to receive external power during external charging from the outside of the vehicle;
 a normally-off relay having one terminal connected to the second power receiving unit;
 a battery charger connected to the first terminal of the first power receiving unit and the other terminal of the relay to charge the power storage device;
 a first voltage detector and a second voltage detector configured to detect voltages at the one terminal and the other terminal of the relay, respectively, and
 a control device configured to control the battery charger, the control device being configured to
  (i) during external charging through the first power receiving unit,
   receive the control signal from the outside through the second terminal of the first power receiving unit, and
   set an input current of the battery charger to have a value smaller than or equal to the first current value indicated by the control signal, and
  (ii) during external charging through the second power receiving unit,
   bring the relay to conduct after detecting that a voltage has been applied to the one terminal of the relay based on a detection result of the first voltage detector and a voltage has not been applied to the other terminal of the relay based on a detection result of the second voltage detector, and
   set the input current of the battery charger to have a value smaller than or equal to a predetermined second current value.

2. The vehicle according to claim 1, wherein
 the control signal includes an oscillation signal of a predetermined frequency, and
 the control device executes external charging using electric power supplied to the first power receiving unit when the oscillation signal has been given to the second terminal of the first power receiving unit, and executes external charging using electric power supplied to the second power receiving unit when the oscillation signal has not been given to the second terminal of the first power receiving unit.

3. The vehicle according to claim 1, wherein the control device outputs an instruction to bring the relay into a non-conducting state with the second power receiving unit receiving external power after termination of external charging through the second power receiving unit, and determines that the relay has been stuck in a conducting state when voltages have been applied to both the one terminal and the other terminal of the relay.

4. The vehicle claim 1, further comprising a cover configured to be closed to cover the first power receiving unit and opened during external charging through the first power receiving unit, so that the first power receiving unit is exposed to the outside, wherein
 the control device does not cause the relay to conduct when the cover is opened.

5. The vehicle according to claim 4, further comprising a lock unit configured to bring the cover, when closed, into a locked state where the cover cannot be opened or closed, and to bring the cover into an unlocked state where the cover is openable and closeable during external charging through the first power receiving unit, wherein
 the control device does not cause the relay to conduct when the cover is in the unlocked state.

6. The vehicle according to claim 1, further comprising a charging cord having one end connected to the second power receiving unit and the other end receiving external power during external charging through the second power receiving unit.

7. The vehicle according to claim 6, further comprising a cord reel configured to release the charging cord out of the vehicle when the charging cord is used and to rewind the charging cord into the vehicle when the charging cord is not used.

8. The vehicle according to claim 6, wherein
 the first power receiving unit is connected to an external charging device with a charging cable during external charging through the first power receiving unit,
 the first current value is a rated current value of the charging cable, and
 the second current value is a rated current value of the charging cord.

* * * * *